Nov. 14, 1939.     R. C. LAPPIN     2,179,792
INDICATING DEVICE FOR TAIL LAMPS AND THE LIKE
Filed April 5, 1937
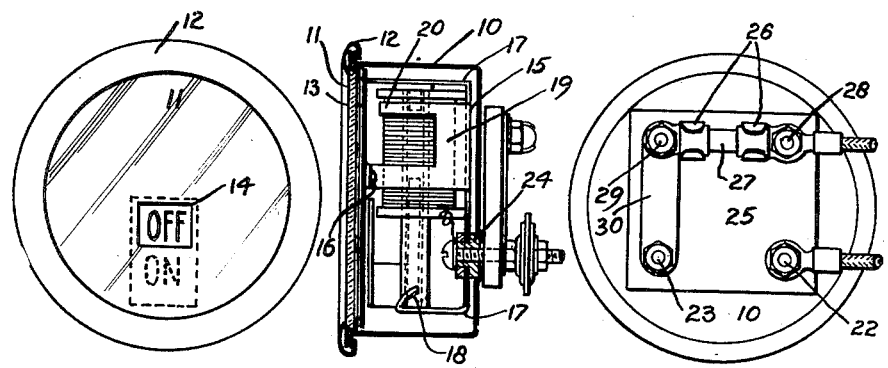
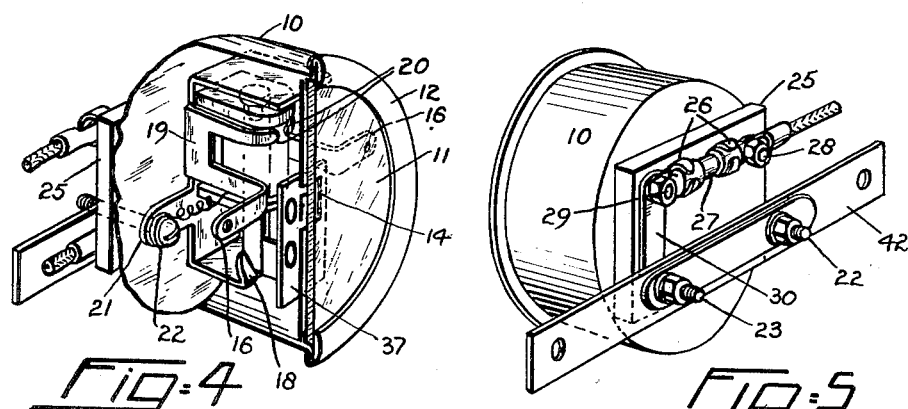
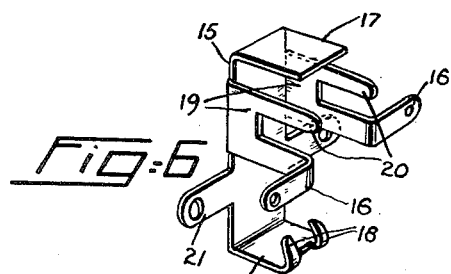
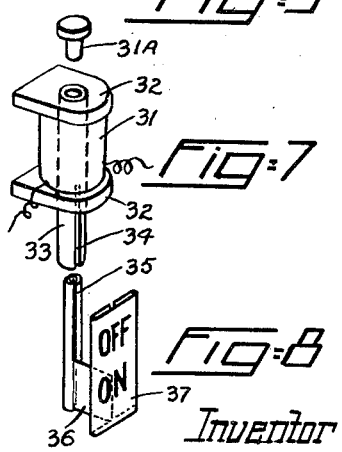
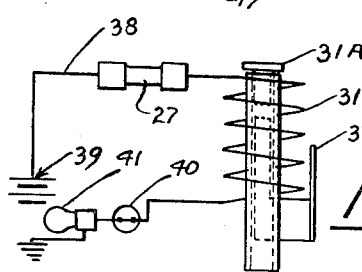
Inventor
Roy C. Lappin
BY Featherstonhaugh and Co.
Attys.

Patented Nov. 14, 1939

2,179,792

UNITED STATES PATENT OFFICE 2,179,792

INDICATING DEVICE FOR TAIL LAMPS AND THE LIKE

Roy Clarence Lappin, Randwick, near Sydney, New South Wales, Australia

Application April 5, 1937, Serial No. 135,178
In Australia October 7, 1936

1 Claim. (Cl. 177—329)

This invention relates to devices for indicating at a convenient point, that a light, or the like as one out of the usual line of vision is on or off, or to otherwise indicate that some subject as a circuit is not functioning. And this invention has been specially devised to provide comparatively cheap, simple and effective means for the abovementioned purpose. The invention is applied more particularly to circuits using a small current at low voltage and is specially suited for use on motor vehicles to indicate to the driver that the number plate and tail light is out due to a burned out lamp, the lamp not switched on, or any fault in the wiring system preventing it from lighting. In the application of this invention to the tail light of motor vehicles, interference therewith will not put said tail light out from the driver's position.

According to this invention a tail light indicating device consists of a suitable case adapted to fit upon a vehicle instrument or dashboard or to be supported at any other suitable point or place where it is readily discernible, said case having a dial or face wherein is displayed means to indicate in a definite manner whether the tail light or the like is functioning, as by the alternative display of the words "on" or "off". The indicating device is operated by a solenoid device the coil or coils of which are connected in series with the circuit of the tail light or the like so that when said light is switched on the solenoid is operated, and suitably indicates in or on the casing dial that the said light is "on". When the light is switched off the solenoid plunger is released and indicates in or on the dial that the said light is "off".

A fuse holder may be embodied with the means for protection of the tail light circuit.

In order to fully describe the invention reference will be made to the drawing accompanying and forming part of this complete specification and wherein:

Fig. 1 is a face view of an indicating device according to the invention and one suited for the tail lights of motor vehicles as well as for other uses, and Fig. 2 is a sectional elevation, and Fig. 3 is a rear elevation of same while, Fig. 4 is a sectional perspective viewed from the face side and Fig. 5 is another perspective viewed from the rear, Fig. 6 is a perspective of the solenoid holding bracket, and Fig. 7 is a perspective of the solenoid coil and parts, while Fig. 8 is a similar view of the plunger and indicator, and Fig. 9 is a circuit diagram of the means in a tail light circuit.

The apparatus is specially suited for mass production methods, and consists of a circular casing 10 of metal (although it may be of any other material) having a glass front 11 retained in place by a bezel 12 clipped in place in any suitable manner.

A metal dial plate 13 is positioned behind the front 11 and has a display slot 14 provided therein and is affixed to the side lugs 16 of a solenoid supporting bracket 15 which holds said plate in position.

The bracket 15 of pressed metal has a flat base portion with out-turned ends 17 one of which has tangs 18 formed thereon for purposes later described and there are side wings 19 with upper fingers 20 and angular lugs 21 which are used to secure the said bracket in place by screws 22 and 23 with insulating bushes 24 interposed between said lugs 21, the screws 22 and 23 and the casing back so that said bracket is kept spaced and insulated from the casing 10. The side lugs 16 connect to the dial plate 13 and retain it in place as previously mentioned.

The screws 22 and 23 connect to a back plate or terminal board 25 of insulating material and carrying a fuse holder 26 in which a cartridge type fuse 27 is adapted to be held and there are side terminals 28 and 29 adjacent the fuse holder 26 and a link 30 connects the terminal 29 with the screw 23.

The solenoid coil 31 has yoke cheeks 32 a core tube 33 of brass or the like slotted at 34 in the protruding portion and carries a fixed iron core element 31A at its top end such element being a push-in fit within the top of the tube 33. The coil 31 is adapted to fit within the hollow of the bracket 15 between its side wings 19 and the fingers 20 are bent around the coil under the top yoke cheek 32 while the tangs 18 bear upon the side of the core tube 33.

When the solenoid coil 31 is in place the bracket 15 and the dial plate 13 form a magnetic circuit or field thereabout thus strengthening the magnetic pull within the tube 33 when the said coil is energized, such coil being connected in series with the tail-light circuit as shown in Fig. 9. Because the magnetic circuit so produced increases the strength of the magnetic pull resulting from the current in the circuit, the device operates reliably with small currents such as that required for a tail light.

The plunger 35 of the solenoid is preferably made of sheet metal of a comparatively soft form circularly wound around layer upon layer until it is of the desired thickness to freely slide within the tube 33, and this construction ensures an efficient magnetic core.

At the lower end one of the core layers is extended as a tongue 36 (which slides in the slot 34 of the tube 33) and is outwardly further shaped to form an indicating member 37 which has suitable indicating matter thereupon as say "Off" at the top portion and "On" on the lower portion, the "Off" being preferably shown in white lettering on a black background while the "On" is shown in white lettering upon a red background.

Referring to the circuit diagram shown in Fig. 9, the tail light circuit indicated by the numeral 38 has a lead from a battery 39 through the fuse 27, solenoid coil 31, to the usual tail light switch 40, and thence to the tail light 41 and the other lead is earthed according to established practice.

In use the indicating device may be suitably positioned upon a vehicle instrument panel or at any other suitable point, say by means of a bar 42 to which the said device is connected by means of the screws 22 and 23 with insulating bushes interposed. When the tail light is switched off, the solenoid coil 31 is not energized and the plunger is down at the end of its movement with its end resting upon the bottom flange 17 of the bracket 15, and in this position the sign "Off" is displayed at the panel opening as seen in Figs. 1, 2, and 4. Upon switching on the tail light the current passing thereto energizes the solenoid coil 31 and draws the plunger 35 into the tube 33 and the sign "On" is shown at the panel opening 14 and will remain in position while the tail light is functioning and should the circuit be interrupted for any reason it will drop and thus indicate at the panel opening.

It is to be understood that the invention is not limited to the application to a tail light of a motor vehicle, but may be applied to any other use where it may be required to indicate whether an electric circuit or the like is "on" or "off".

I claim:

An indicating device comprising a solenoid, a plunger movable axially into the core thereof, said plunger being composed of soft sheet metal rolled layer upon layer and having a portion of its outer layer radially extended, and said extension being formed as an indicating element.

ROY CLARENCE LAPPIN.